No. 620,738. Patented Mar. 7, 1899.
W. V. CHISHOLM.
WRENCH.
(Application filed July 11, 1898.)
(No Model.)
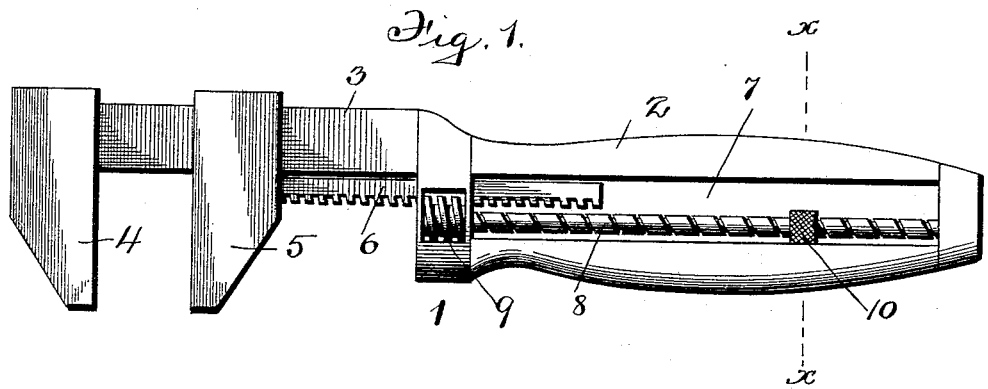
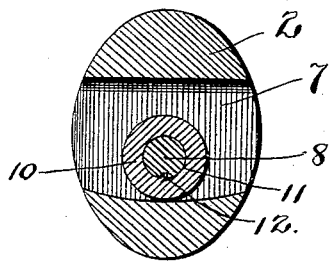
Witnesses:
T. L. Mockabee
Horace G. Deitz
William V. Chisholm Inventor
By Marion & Marion
His Attorneys
THE NORRIS PETERS CO., PHOTO-LITHO., WASHINGTON, D. C.

UNITED STATES PATENT OFFICE.

WILLIAM V. CHISHOLM, OF ASHDALE, CANADA.

WRENCH.

SPECIFICATION forming part of Letters Patent No. 620,738, dated March 7, 1899.

Application filed July 11, 1898. Serial No. 685,627. (No model.)

*To all whom it may concern:*

Be it known that I, WILLIAM V. CHISHOLM, a citizen of the Dominion of Canada, residing at Ashdale, county of Antigonish, Province of Nova Scotia, Canada, have invented certain new and useful Improvements in Wrenches; and I do hereby declare the following to be a full, clear, and exact description of the invention, such as will enable others skilled in the art to which it appertains to make and use the same.

My invention relates to improvements in wrenches.

The object of my invention is to provide a device of this character with mechanism by means of which the movable jaws can be adjusted with rapidity and with ease.

A further object is to provide a device of this character which is neat and attractive in appearance, simple in operation, durable in construction, and which can be made at a moderate cost.

To these ends my invention consists in the improved construction and combination of parts hereinafter fully described, and particularly pointed out in the appended claims.

In the drawings, in which similar numerals of reference indicate similar parts in all of the views, Figure 1 is a side elevation of a wrench constructed in accordance with my invention. Fig. 2 is a similar view taken on line *x x* of Fig. 1.

1 designates my improved wrench, having the handle 2, to which is secured a shank 3, having at its front end a fixed jaw 4.

5 designates the movable jaw, which is slidably mounted on the shank 3 and is provided with a rearwardly-extending rack portion 6, which extends through a suitable opening formed in the front end of said handle into a longitudinal slot 7. (Best shown in Fig. 1.) The handle is further provided with a spirally-grooved rod 8, which is mounted in said slot, having its front end connected to a suitable worm 9, which is pivotally mounted in the front end of the handle, said worm being adapted to engage with and operate the teeth of the rack portion 6. A suitable nut 10, having an opening 11, is mounted on the rod 8, said nut being also provided with an inwardly-extending lug 12, which is adapted to move in the grooves formed on the rod 8. It will be readily seen that when the nut 10 is grasped by the fingers of the hand and the nut then pushed either backward or forward on said rod 8 the rod 8 will receive a rotatory movement, which also moves the worm 9 in a corresponding direction, and thus imparting a movement to the rack portion 6 in an obvious manner. It will also be apparent that inasmuch as the rod 8 and worm 9 are mounted within the handle there is no liability of the rod 8 becoming accidentally turned when the wrench is in use, and therefore that the movable jaw 5 will retain its position until it is moved by again grasping the nut 10 and moving it backward or forward. It is to be understood, however, that the movement of the nut 10 is not a rotary one, but that the nut is held stationary until it is moved backward and forward over the rod.

In the operation of my improved wrench while it is apparent that the movement of the nut from one end of the rod 8 to its opposite end will cause the movable jaw to move its entire distance, yet it may be found preferable to place the nut 10 in a convenient position close to the front end of the handle when the movable jaw has about reached its proper position, and this can be readily done by giving the nut 10 a rotary movement, which will cause it to move freely on the rod 8 without changing the position of the jaw 5, this movement bringing the nut 10 to a position near the front end of the handle, when it can be moved backward and forward a slight distance in order to bring the jaw into its exact position. Another advantage of this construction is that after the position of the jaw 5 has been found and it is desired to prevent it from being moved outwardly—as, for instance, when the wrench has been applied to a nut or other article and is to be held against any liability of being removed by attempting to loosen or tighten the object to which it is secured—the nut 10 will be given a rotary movement and carried back against the rear wall of the handle, thus forming a lock to prevent any liability of the jaw 5 being moved away from the jaw 4, inasmuch as the rod 9 would not be liable to be moved excepting by the manipulation of the nut 10, as before set forth.

Having thus described my invention, what I claim as new is—

1. A wrench comprising a fixed jaw having a shank; a jaw movable longitudinally of said shank; mechanism, operatively connected to said movable jaw for imparting movement thereto; and means, operated by pressure exerted longitudinally of said shank, for imparting a rotary movement to said mechanism.

2. A wrench, comprising a fixed jaw having a shank; a jaw movable longitudinally of said shank, said movable jaw being provided with a rack portion; mechanism rotatively mounted in the handle of said wrench and having an operative connection with said rack portion, for imparting a movement to said movable jaw; and means operated by pressure exerted longitudinally of said shank, for imparting a rotary movement to said mechanism.

3. A wrench, comprising a fixed jaw having a shank; a jaw movable longitudinally of said shank, said jaw being provided with a rack portion; a spirally-grooved rod pivotally mounted on said shank portion said rod having a worm secured thereto, said worm being adapted to engage with and operate in the teeth of said rack portion; and a nut mounted on said rod, said nut being adapted to impart a rotatory movement to said rod when pressure is exerted thereon longitudinally of said shank portion.

In witness whereof I have hereunto set my hand in the presence of two witnesses.

WILLIAM V. CHISHOLM.

Witnesses:
WILLIAM CHISHOLM,
DUNCAN D. CHISHOLM.